United States Patent [19]
Aiken

[11] 3,904,765
[45] Sept. 9, 1975

[54] PROCESS FOR CONTROLLING LAMELLAR DYSTROPHY OF FINGERNAILS

[76] Inventor: David W. Aiken, 2405 River Rd., Jefferson, La. 70121

[22] Filed: July 18, 1973

[21] Appl. No.: 380,472

[52] U.S. Cl. .............................................. 424/319
[51] Int. Cl. ............................................ A61k 27/00
[58] Field of Search .............................. 424/319, 61

[56] References Cited
UNITED STATES PATENTS
3,009,859   11/1961   Laborit et al. ................. 424/319 X

OTHER PUBLICATIONS

"Cosmetics & the Skin," Wells and Lubowe, pp. 18, 19, 291–293, (1964).

*Primary Examiner*—Albert T. Meyers
*Assistant Examiner*—Leonard Schenkman
*Attorney, Agent, or Firm*—Clarence A. O'Brien; Harvey B. Jacobson

[57] ABSTRACT

Ungual lamellar dystrophy and hypoplastic nails in humans can be treated by administering a composition consisting essentially of, as the active ingredient, a salt of aspartic acid selected from the group consisting of sodium, potassium, calcium, magnesium and mixtures thereof. Particularly useful is an aspartate salt combination consisting essentially of an equal proportion mixture of potassium aspartate and magnesium aspartate.

6 Claims, No Drawings

PROCESS FOR CONTROLLING LAMELLAR DYSTROPHY OF FINGERNAILS

The present invention relates to a method for treating and controlling ungual lamellar dystrophy.

Ungual lamellar dystrophy, or splitting fingernails, is a not uncommon condition which occurs mainly in women. It is characteristically manifested by a layered splitting, like birch bark, with flaking at the ends of the nails. Typically, the splitting extends proximally one to three millimeters. For a cosmetic standpoint the condition is unsightly and splitting nails cannot be "worn long". The cause of ungual lamellar dystrophy is unknown and, heretofore, no drug or vitamin has been found effective in treating the condition.

Accordingly, it is the primary object of the present invention to provide a method for effectively treating ungual lamellar dystrophy. In furtherance of that object it has been found that the condition can be successfully treated with compositions which essentially comprise, as active or recovery-promoting ingredients, soluble salts of aspartic acid. Specifically, the alkali and alkaline earth metal aspartates such as sodium, potassium, calcium and magnesium aspartate and mixtures thereof are especially effective. One particularly desirable composition is a mixture of potassium aspartate and magnesium aspartate in roughly equal proportions.

The pharmaceutical value of alkali and alkaline earth metal aspartates has previously been recognized in U.S. Pat. No. 3,009,859 to Laborit et al., granted Nov. 21, 1961, the disclosure of which is hereby incorporated herein by reference. In the Laborit et al. patent the aspartates are taught to be valuable as anti-fatigue drugs and also beneficial in treating ailments evidencing a fatigued or exhausted condition of cells, such as liver deficiency of both primary and secondary character, and the sequelae or splanchic vasomotor disturbance, e.g. due to shock from injury or severe burns, states of respiratory deficiency, myocardic infarctus, and other states. When used as an anti-fatigue composition the aspartate may be employed as an aqueous solution containing about 10% by weight aspartate salt and optionally containing from 1 to 5 parts by weight per 1000 parts by weight aspartate salt of adenosine triphosphate. Alternatively, the aspartates may be administered orally in solid form such as powder or tablets. One preferred tablet formulation comprises essentially 250 milligrams magnesium aspartate and 250 milligrams potassium aspartate and includes small quantities, e.g., 2 milligrams, of adenosine triphosphate.

The aspartate compositions taught in U.S. Pat. No. 3,009,859, and particularly the magnesium-potassium aspartate combination, have been found to be effective in the treatment of ungual lamellar dystrophy. Accordingly, the treatment method of the present invention constitutes a new use for a heretofore known pharmaceutical. In one of its forms the pharmaceutical has been commercially marketed under the trademark "Spartase" by Wyeth Laboratories, Inc. Spartase is a mixture of equal amounts of the potassium and magnesium salts of aspartic acid and has been marketed as therapeutic in the management of fatigue, although some question as to its effectiveness even for that limited purpose has arisen. It is a non-toxic drug essentially free of side effects, although mild nausea, abdominal discomfort and diarrhea have been occasionally reported.

To demonstrate the usefulness of the aspartic acid salts in the treatment of ungual lamellar dystrophy and hypoplastic nails, certain clinical studies were conducted as set forth in the following examples.

EXAMPLE I

Ten women with ungual lamellar dystrophy were treated with a mixture of potassium and magnesium aspartates. The dosage for each woman was two 500 milligram tablets (each containing about 250 milligrams of potassium aspartate and 250 milligrams of magnesium aspartate) taken orally 3 or 4 times daily, preferably after meals and at bedtime. The nails of each of the women were periodically examined. In all but one patient a response was noted in 3 to 4 weeks (the precise time of response being impossible to determine in view of the slow growth rate of nails) with an observable cessation of splitting. Inasmuch as normal regrowth of an entire fingernail usually takes 6 to 12 weeks it is believed that the aspartate composition functioned either by accelerating fingernail growth or by influencing the nail structure at a point distal to the germinal growth bed, or both.

Following the favorable response administration of the aspartate composition in some of the patients was terminated. Splitting of the nails returned in each case.

EXAMPLE II

Two teenage girls whose nails were neither cut nor bitten, yet were very short, suffered from fingernail hypoplasia, i.e., their nails did not grow at all. The girls were treated by orally administering to each two 500 milligram tablets (each containing about 250 milligrams of potassium aspartate and 250 milligrams of magnesium aspartate) 3 or 4 times daily, preferably after meals and at bedtime. In one patient all fingernails (and toenails) began growing in a short time. In the other patient some nail growth also occurred, but it was asymmetric.

The observed effectiveness of aspartate salts, and particularly magnesium and potassium aspartates, in treating ungual lamellar dystrophy, and the favorable growth response in the patients with hypoplastic nails has never before been reported or suggested in the medical literature. Moreover, the known use of these aspartate compositions, as an anti-fatigue drug, has no apparent relevance whatever to their use in preventing nail splitting and in promoting growth of fingernails. Further, there have been clinical indications that these same aspartate compositions may be effective in controlling splitting ends of hair and in accelerating hair growth rate.

While the present invention has been described with reference to particular embodiments thereof it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A method of controlling splitting fingernails and promoting growth of fingernails in humans which comprises orally administering to such humans an effective amount of an active ingredient consisting essentially of a salt of aspartic acid selected from the group consisting of sodium, potassium, calcium, magnesium and mixtures thereof.

2. The method of claim 1 wherein said salt is selected from the group consisting of potassium aspartate, magnesium asparate and mixtures thereof.

3. The method of claim 2, wherein said salt is a mixture, in approximately equal proportions by weight, of potassium aspartate and magnesium aspartate.

4. The method of claim 3 wherein said active ingredient additionally contains 1 to 5 parts by weight adenosine triphosphate per 1000 parts by weight of said aspartate salt mixture.

5. The method of claim 3, wherein said aspartate salt mixture is in solid form.

6. The method of claim 3 wherein said active ingredient is orally administered at least three times daily, each administration containing about 1000 milligrams of said aspartates.

* * * * *